(12) United States Patent
Squire et al.

(10) Patent No.: US 8,077,739 B2
(45) Date of Patent: Dec. 13, 2011

(54) METHODS, COMMUNICATION NETWORKS, AND COMPUTER PROGRAM PRODUCTS FOR COMMUNICATING TIME DIVISION MULTIPLEXING TRAFFIC USING A TRAFFIC ENCAPSULATION STANDARD CONFIGURED TO SUPPORT STATISTICAL MULTIPLEXING (STATMUX) TRAFFIC

(75) Inventors: Matthew B. Squire, Raleigh, NC (US); Greg Goodchild, Cary, NC (US); Mark Wartski, Raleigh, NC (US)

(73) Assignee: Hatteras Networks, Inc., Durham, NC (US)

( * ) Notice: Subject to any disclaimer, the term of this patent is extended or adjusted under 35 U.S.C. 154(b) by 119 days.

(21) Appl. No.: 12/464,495

(22) Filed: May 12, 2009

(65) Prior Publication Data

US 2009/0279424 A1 Nov. 12, 2009

Related U.S. Application Data

(60) Provisional application No. 61/052,481, filed on May 12, 2008.

(51) Int. Cl.
*H04J 3/16* (2006.01)
(52) U.S. Cl. ....................................... 370/466
(58) Field of Classification Search .. 370/395.5–395.53, 370/395.61–395.65, 464–474, 498, 536–541
See application file for complete search history.

(56) References Cited

U.S. PATENT DOCUMENTS

| | | | |
|---|---|---|---|
| 7,693,090 B1 * | 4/2010 | Kimpe | 370/254 |
| 2006/0062244 A1 * | 3/2006 | Oksman | 370/465 |
| 2007/0233894 A1 * | 10/2007 | Ling et al. | 709/236 |
| 2008/0075111 A1 * | 3/2008 | Hu et al. | 370/465 |
| 2008/0219669 A1 * | 9/2008 | Fourcand | 398/98 |
| 2009/0086759 A1 * | 4/2009 | Heise et al. | 370/474 |

OTHER PUBLICATIONS

Squire, Metro Ethernet Copper Access Handbook, Hatteras Networks, 31 pages, 2005.*
Eriksson et al, VDSL2: Next important broadband technology, Ericsson Review No. 1, 12 pages, 2006.*

* cited by examiner

*Primary Examiner* — Frank Duong
(74) *Attorney, Agent, or Firm* — Myers Bigel Sibley & Sajovec (57) ABSTRACT

A communication network is operated by communicating Time Division Multiplexing (TDM) traffic and data (STATMUX) traffic over a single connection, where the single connection may include multiple aggregated lines using a traffic encapsulation standard configured to support STATMUX traffic.

28 Claims, 4 Drawing Sheets

1) Constant bit rate TDM stream

2) Broken into 512b blocks

3) Mapped into 64/65 encapsulation

▓ *Codeword(s) for data*
■ *Codeword for TDM*

FIG. 5

1) Constant bit rate TDM stream

2) Broken into payload blocks

3) TDM header pre-pended including circuit ID

4) Mapped into 64/65-octet via codeword differentiation

METHODS, COMMUNICATION NETWORKS, AND COMPUTER PROGRAM PRODUCTS FOR COMMUNICATING TIME DIVISION MULTIPLEXING TRAFFIC USING A TRAFFIC ENCAPSULATION STANDARD CONFIGURED TO SUPPORT STATISTICAL MULTIPLEXING (STATMUX) TRAFFIC

RELATED APPLICATION

This application claims the benefit of Provisional Application Ser. No. 61/052,481, filed May 12, 2008, the disclosure of which is hereby incorporated herein by reference.

BACKGROUND OF THE INVENTION

The present invention relates to packet communication methods, networks, and computer program products, and, more particularly, to communication methods, networks, and computer program products for communicating time division multiplexing (TDM) traffic and data (STATMUX) traffic over a single connection, where the single connection may comprise multiple aggregated lines.

There have been a number of recent enhancements that have improved the ability to deliver services over access networks. Many of these techniques have dealt with mechanisms for delivering data services, although in certain cases advances have addressed TDM services instead. An example of such techniques has been introduced in IEEE 802.3 for delivering native Ethernet over one or more DSL lines, also known as the Ethernet in the First Mile (EFM) project, or IEEE 802.3ah.

In those cases where both data and TDM services have been addressed simultaneously, they have been primarily addressed via an overlay network—running TDM over a data network, or data over a TDM network. Although this can be successful and desirable in some cases, it does create a new service type that generally differs from its original service via some important characteristics. For example, when delivering TDM services over a data network, the TDM service often has significantly different jitter and synchronization characteristics than a traditional TDM service delivered over a synchronous network. Examples of conventional approaches for delivering data services, TDM services, and both data and TDM services over one or more access lines will now be described.

Data Service Delivery

Early ITU standards for delivering data services over access lines used one of two alternatives: HDLC or ATM. Both of these techniques have generally fallen out of favor for the more efficient techniques discussed below.

Standards from both the IEEE and ITU have generally improved the ability to deliver data transport over access systems. The primary advances initiated by these standards are:

a) An encapsulation technique known as 64/65-octet encapsulation was introduced in IEEE 802.3, which allowed a generally efficient and predictable method for delivering variable size Ethernet packets over an xDSL system. Whereas previous data encapsulation techniques typically had variable and potentially high overhead, this technique is very efficient for data transport.

b) A bonding technique known as Ethernet bonding was introduced in IEEE 802.3, which allowed multiple access lines of various and distinct qualities to be aggregated together into one virtual Ethernet interface. This technique was the first to allow variable rate access lines to be aggregated together, and to provide a dynamic and flexible environment in which the impact of a failure or addition of a line was relatively small. This technique was generalized in ITU G.998.2 to apply to more generic access technologies than the ones covered in IEEE 802.3.

c) The 64/65-octet encapsulation techniques were expanded in ADSL2 Amendment 1 to apply to several access technologies, and to allow, among other things, pre-emption. Pre-emption ensures that high priority data does not have to wait behind lower priority data, thus allowing that data to jump to the head of the line and have a much lower latency. Latency is typically a key metric for TDM delivery.

All of these techniques have combined to offer a generally high-speed, efficient, flexible, and reliable access network for data services.

At the same time these standards were developing for delivery of data natively over xDSL access lines, the ITU was developing standards for delivering data over TDM (SONET/SDH) infrastructures. Two methods developed for encapsulating data over SONET/SDH in a flexible manner are X86 and the Generic Framing Protocol (GFP).

TDM Service Delivery

TDM services have historically been delivered over xDSL technologies such as HDSL [HDSL], and SHDSL [SHDSL]. When delivering TDM services, the access line runs at the exact rate required for that TDM service. For example, a 2048 Kbps E1 service is delivered over an access line with a 2048 Kbps payload rate. The basic traditional techniques allow for exactly one TDM service per line.

To improve the reach of the TDM service, methods were introduced to run the TDM service over two lines (called 4-wire mode in SHDSL). In this case, each line delivered half the payload rate of the desired end service (e.g. each line ran at 1024 Kbps for a 2048 Kbps service).

TDM services have also been enhanced with a multi-line aggregation strategy with Virtual Concatenation (VCAT) and Link Capacity Adjustment Scheme (LCAS). These techniques allow for combining, or concatenating, multiple lines into a single aggregate connection. The primary application of VCAT/LCAS is as an underlying aggregation technique for GFP, where a single, large multi-line pipe is created for a data service. For example, five (5) E1s, each at 2 Mbps, can be combined into a single 10 Mbps data service.

Data and TDM Service Delivery

Access networks deliver a large amount of voice/TDM services in addition to an ever-increasing amount of data services. In some cases, these TDM applications can be delivered over the packet network using techniques, such as Voice Over IP (VoIP) and Pseudowire End-to-End Emulation (PWE3). These techniques use a packet network to deliver voice services, and can be a sufficient delivery mechanism for some TDM applications.

There are some cases, however, where emulation of TDM services over a packet network may result in insufficient performance. This is true with both VoIP and PWE3. One such application is in the area of backhaul for cellular services. Cellular equipment has been designed and built based upon the performance characteristics of traditional TDM access services, such as a T1 line. The performance characteristics of an emulated T1 service can be significantly different than those for the traditional T1 service, and replacing a traditional service with an emulated service can result in serious problems for the mobile backhaul network.

Additionally, for transport operators that "sell" a service to another provider, an emulated TDM service cannot be sold as a native TDM service because of those performance differences. An emulated TDM service would most often have to be priced and sold differently than a native TDM service. For these reasons and others, simple emulation of a native TDM service is often unsatisfactory.

A rarely used historical technique for the simultaneous delivery of TDM and data services over xDSL is known as dual-bearer mode. Dual-bearer mode partitions a single physical DSL line into two parts: one part transporting TDM, and one part transporting data. Dual-bearer mode may suffer from several limitations that may make it difficult to use in a multi-line environment:

a) Dual-bearer mode is defined to operate on a single line. Although it can certainly be independently applied to each line in a multi-line group, there are no defined algorithms for partitioning one or more TDM circuits over multiple dual-bearer lines.

b) Dual-bearer mode requires synchronization. The TDM slots on each line (in 2-pair/4-wire mode) are reserved, and any multi-line distribution algorithm would involve synchronization between the distribution algorithm and the lines over which it is transmitting.

c) Dual-bearer mode statically reserves bandwidth for TDM on each line. In the event of line failures, there is no process to move or re-distribute the TDM traffic over the multiple lines in a simple fashion.

d) Because of the static partitioning of TDM and data applications, the addition or removal of TDM bandwidth from a dual-bearer line may be difficult and must be synchronized and coordinated at both ends of each line, introducing a complicated coordination process.

SUMMARY

According to some embodiments of the present invention, a method of operating a communication network comprises communicating Time Division Multiplexing (TDM) traffic on a single line using a traffic encapsulation standard configured to support Statistical Multiplexing (STATMUX) traffic to encapsulate blocks of the TDM traffic.

In other embodiments, the traffic encapsulation standard is 64/65-octet encapsulation.

In still other embodiments, the TDM traffic comprises constant bit-rate TDM traffic.

In still other embodiments, the method further comprises communicating STATMUX traffic on the single line with the TDM traffic using the 64/65-octet encapsulation standard.

In still other embodiments, the method further comprises using a 64/65-octet encapsulation standard codeword to differentiate TDM traffic from STATMUX traffic.

In still other embodiments, the method further comprises dynamically adjusting an amount of TDM traffic and/or STATMUX traffic carried on the single line over time.

In still other embodiments, the method further comprises combining a first constant bit-rate TDM traffic stream with a second constant bit-rate TDM traffic stream to generate a TDM traffic stream having a constant bit-rate equal to the sum of the first and second constant bit-rates, wherein communicating the TDM traffic comprises communicating the TDM traffic stream having the constant bit-rate equal to the sum of the first and second constant bit-rates.

In still other embodiments, communicating TDM traffic comprises multiplexing a plurality of TDM traffic streams onto the single line.

In still other embodiments, the traffic encapsulation standard is 64/65-octet encapsulation and multiplexing the plurality of TDM traffic streams comprises communicating a TDM header in a payload field of the 64/65-octet encapsulation block that contains a circuit identifier, which identifies one of the plurality of TDM traffic streams that the block is associated with.

In still other embodiments, the TDM header comprises an error detection and/or correction portion.

In still other embodiments, the traffic encapsulation standard is 64/65-octet encapsulation and multiplexing the plurality of TDM traffic streams comprises using a codeword field of the 64/65-octet encapsulation block to identify one of the plurality of TDM traffic streams that the block is associated with.

In further embodiments, a method of operating a communication network comprises distributing Time Division Multiplexing (TDM) traffic onto a plurality of lines asynchronously.

In still further embodiments, the method further comprises using a traffic encapsulation standard configured to support STATMUX traffic to encapsulate blocks of the TDM traffic on each of the plurality of lines.

In still further embodiments, the TDM traffic comprises constant bit-rate TDM traffic.

In still further embodiments, the lines do not all have a same bandwidth associated therewith.

In still further embodiments, a number of the plurality of lines changes dynamically.

In still further embodiments, the method further comprises dynamically adjusting an amount of TDM traffic distributed to the plurality of lines based on a total bandwidth available on the plurality of lines.

In still further embodiments, the method further comprises determining respective fullness measures for each of the plurality of lines, each fullness measure indicating a number of octets waiting to be transmitted on a respective one of the lines and/or a time required to transmit the number of octets waiting to be transmitted on the respective one of the lines.

In still further embodiments, distributing the TDM traffic comprises distributing the TDM traffic onto the plurality of lines asynchronously based on the fullness measures associated with the lines, respectively.

In still further embodiments, a faulted and/or removed line has an effective infinite fullness measure associated therewith and a new line has an effective initial fullness measure of zero.

In still further embodiments, the method further comprises creating a virtual interface for the plurality of lines using link aggregation as defined in the IEEE 802.3 Ethernet standard and distributing the TDM traffic onto the plurality of lines asynchronously via the virtual interface.

In still further embodiments, the method further comprises distributing Statistical Multiplexing (STATMUX) traffic onto the plurality of lines.

In still further embodiments, the method further comprises determining respective TDM fullness measures for each of the plurality of lines, each TDM fullness measure indicating a number of TDM traffic octets waiting to be transmitted on a respective one of the lines and/or a time required to transmit the number of TDM traffic octets waiting to be transmitted on the respective one of the lines, and determining respective STATMUX fullness measures for each of the plurality of lines, each STATMUX fullness measure indicating a number of TDM traffic octets and STATMUX traffic octets waiting to be transmitted on a respective one of the lines and/or a time required to transmit the number of TDM traffic octets and STATMUX traffic octets waiting to be transmitted on the respective one of the lines.

In still further embodiments, distributing the TDM traffic comprises distributing the TDM traffic onto the plurality of lines asynchronously based on the TDM fullness measures associated with the lines, respectively, and distributing the STATMUX traffic onto the plurality of lines based on the STATMUX fullness measures associated with the lines, respectively.

In still further embodiments, distributing TDM traffic comprises multiplexing a plurality of TDM traffic streams onto one of the plurality of lines.

In still further embodiments, a 64/65-octet encapsulation standard is used to encapsulate blocks of the TDM traffic and wherein multiplexing the plurality of TDM traffic streams comprises communicating a TDM header in a payload field of the 64/65-octet encapsulation block that contains a circuit identifier, which identifies one of the plurality of TDM traffic streams that the block is associated with.

In still further embodiments, the TDM header comprises an error detection and/or correction portion.

In still further embodiments, a 64/65-octet encapsulation standard is used to encapsulate blocks of the TDM traffic and multiplexing the plurality of TDM traffic streams comprises using a codeword field of the 64/65-octet encapsulation block to identify one of the plurality of TDM traffic streams that the block is associated with.

In still other embodiments, a communication network is configured to carry one or more of the above-described methods.

In still other embodiments, a computer program product comprises computer-readable program code embodied on a computer-readable medium, the computer readable program code being configured to carry out one or more of the above-described methods.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Embodiments of the present invention are described herein in the context of processing a block. It will be understood that the term "block" means a unit of information and/or a collection of data that may be transmitted electronically as a whole or via segments from one device to another. Accordingly, as used herein, the term "block" may encompass such terms of art as "frame," "packet," and/or "message," which may also be used to refer to a unit of transmission.

For purpose of illustration, embodiments of the present invention are described herein in the context of data service traffic and Time Division Multiplexing (TDM)/voice traffic. It will be understood that data service traffic refers generally to traffic that uses Statistical Multiplexing (STATMUX) for communication link sharing in which a communication channel is divided into an arbitrary number of variable bit-rate digital channels or data streams. The link sharing is adapted to the instantaneous traffic demands of the data streams that are transferred over each channel.

The present invention may be embodied as communication networks, systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of communication networks, methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Embodiments of the present invention may provide mechanisms for delivering multiple applications, such as TDM and/or data service traffic over a single connection comprising multiple aggregated lines, thereby extending the benefits of multi-line operation to TDM applications as well as TDM and data applications simultaneously.

Figure 1:
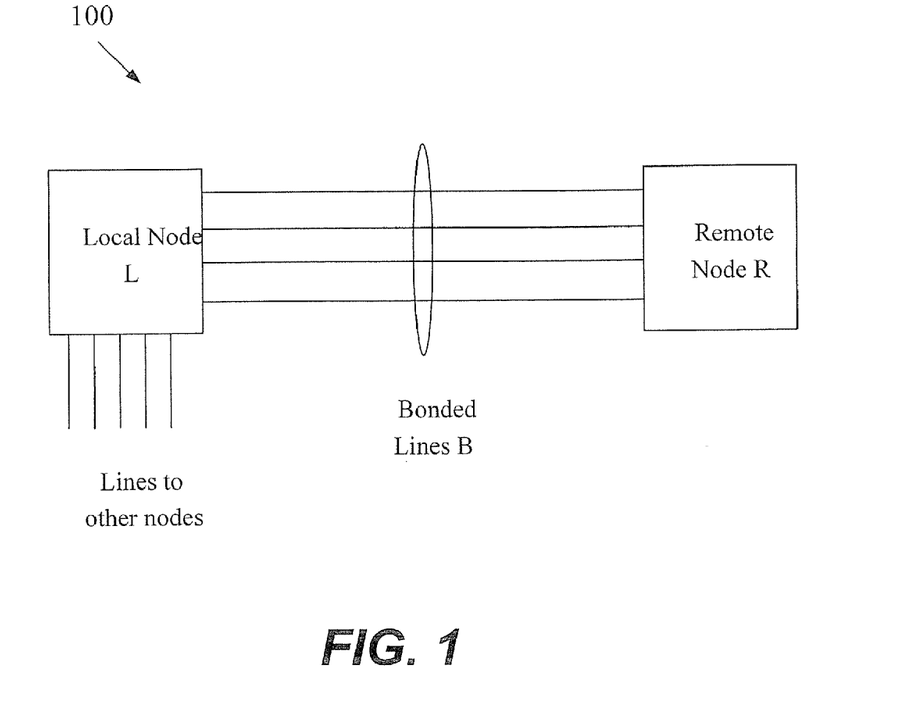
FIG. 1 is a block diagram that illustrates a pair of network nodes connected by multiple communication links in accordance with some embodiments of the present invention.

FIG. 1 is a communication network 100 that can be used in communicating TDM traffic and/or data traffic in accordance with some embodiments of the present invention. The communication network 100 includes a local node L and a remote node R that are coupled to one another by a plurality of bonded lines B. Either of the nodes L and R may have additional lines connecting the node to one or more other units that operate independently of the lines B between the nodes L and R.

Figure 2:
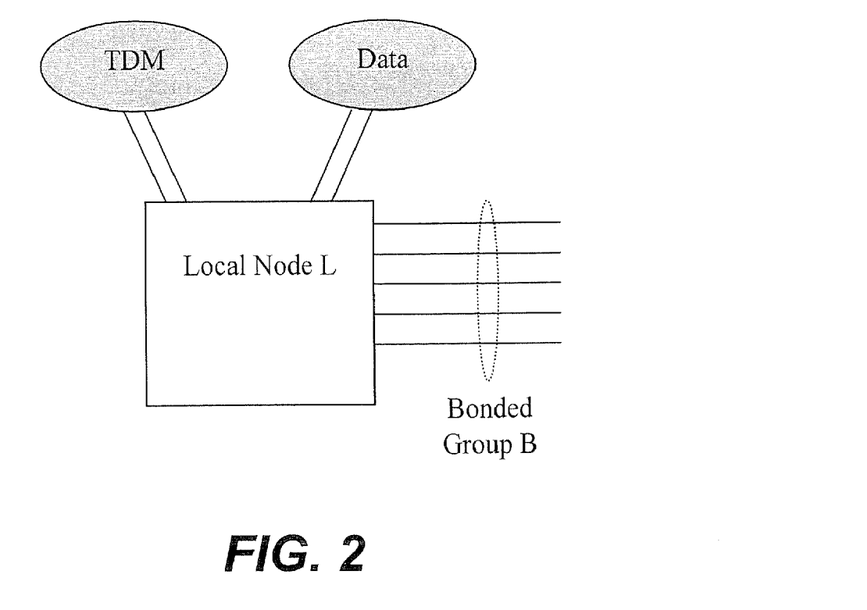
FIG. 2 is a block diagram that illustrates one of the network nodes of FIG. 1 in accordance with some embodiments of the present invention.

Both the L and R nodes may have multiple application interfaces in accordance with some embodiments of the present invention. For example, as shown in FIG. 2, node L may have interfaces for both a TDM service application and a data service application. The node L may have multiple inputs for each application. These inputs may be on different physical interfaces, may share an external interface, or could be internally generated in accordance with various embodiments of the present invention. In general, the nodes L and R are capable of identifying and differentiating between applications in accordance with various embodiments of the present invention.

Figure 3:
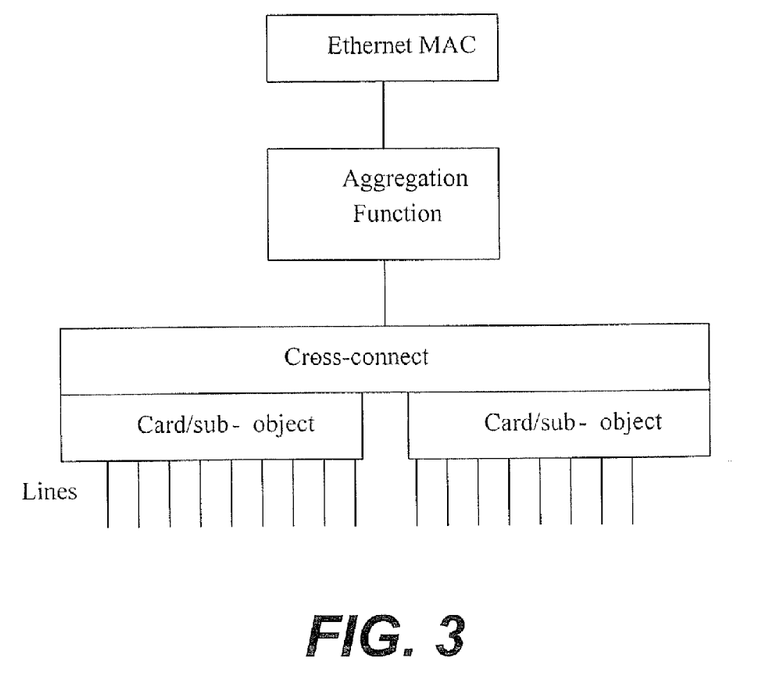
FIG. 3 is a block diagram that illustrates a line bonding architecture in accordance with some embodiments of the present invention.

Each of the lines in B between L and R may be independent of the others and can have performance characteristics that differ from any/all other lines in the group. Additional lines can be brought into the group B or removed from the group at any time due to operational event or administrative actions. Some lines in B may be running with high rates and low bit-error-rate (BER), while others might have lower rates or higher BER. In traditional data bonding techniques (IEEE 802.3), lines are connected to a data (Ethernet) interface via an MII interface to an aggregation function, which is in turn connected to an optional cross-connect that provides connectivity between the aggregation function and all of the lines. This is illustrated in FIG. 3 in which an aggregation function couples sub-object line cards to an Ethernet Medium Access Control (MAC) function, A cross-connect may be used as an interface between the sub-objects, which terminate the lines, and the aggregation function.

Within a single node (L or R), the lines in the bonded group B may be partitioned across different components in the node. For example, they may be partitioned across different cards in a multi-card chassis. This ability to distribute the bonded lines across different replaceable sub-objects may provide improved reliability in that in the event of a failure, one sub-object can be removed and replaced without affecting the other sub-objects. This may provide the benefit that connectivity is maintained between L and R even during failures and replacements. Some lines in the bonded group may be affected, but not all, thus maintaining connectivity.

Figure 4:
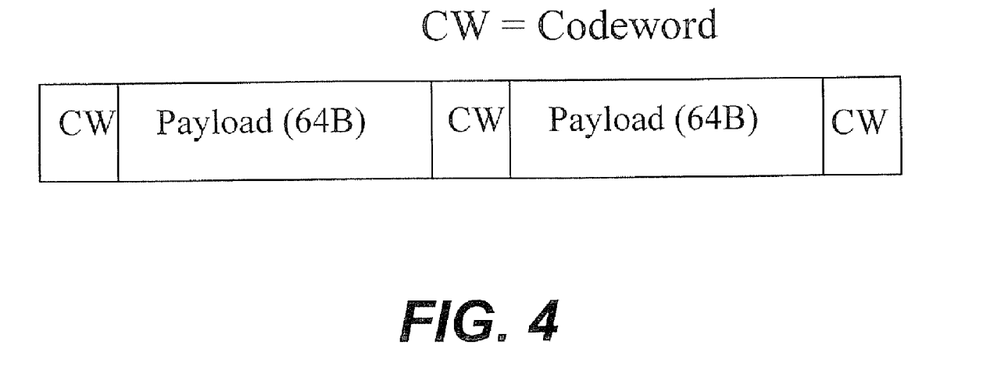
FIG. 4 is a block diagram that illustrates 64/65-octet encapsulation in accordance with some embodiments of the present invention.

When carrying data applications, e.g., Ethernet applications, the lines may use a traffic encapsulation standard designed to support STATMUX traffic to encapsulate blocks of traffic. One such technique is 64/65-octet encapsulation as defined in IEEE 802.3. This encapsulation technique generally uses one octet of overhead followed by 64 octets of data, where the data is typically an Ethernet frame or a fragment/part of an Ethernet frame. This is illustrated in FIG. 4 where each unit of transmission is shown to comprise a one octet codeword followed by 64 octets of payload.

There are a variety of codewords used in 64/65-octet encapsulation, where the codeword is a specific octet value used in the one-octet of overhead that identifies the contents of the following 64-octets. For example, there is a specific code word that identifies the following 64-octets as carrying part of an Ethernet frame that terminates within those 64-octets, another codeword that identifies the following 64-octets as carrying idle (no data) octets, etc.

There are also special codewords to support pre-emption. Pre-emption is the ability for a frame to jump to the head of the line and be transmitted starting in the next 64/65-octet block, rather than waiting for the current frame (and any other data queued behind it) to be transmitted.

In normal operation, once the first octet of a frame, which may comprise multiple 64/65-octet blocks, is transmitted, the rest of that frame is completed before any other frame transmission can begin. So, for example, a high-priority short frame that becomes ready to be sent just after the first octet of a large low-priority frame is transmitted must wait for the entirety of the large low-priority frame to be sent, which may be thousands of octets. Pre-emption bypasses that waiting period and the short high-priority frame only has to wait until the start of the next 64/65-octet block, which is at most 64-octets away.

Communicating TDM or TDM and STATMUX Traffic on a Single Line

Embodiments of the present invention will now be described in which TDM traffic is delivered on a single line and in which TDM and data traffic are both delivered on a single line. As described above, 64/65-octet encapsulation may be used to deliver data services natively over an access line. One characteristic of this encapsulation mechanism is the regular nature of the 64/65-octet blocks-one 64-octet block of payload can be transmitted every 65-octets, which may create a regular and predictable channel. According to some embodiments of the present invention, TDM service traffic may be communicated on a single line using a traffic encapsulation standard configured to support STATMUX traffic, such as, for example, the 64/65-octet encapsulation standard, to encapsulate blocks of the TDM traffic.

The 64/65-octet encapsulation standard may be viewed as partitioning a line into a series of time-division multiplexed 65-octet blocks, with one octet of overhead per block. Mapping a TDM service, which may be a constant bit rate service, may be partitioned into "TDM blocks," which are then mapped into the next available 64/65-octet block.

Figure 5:
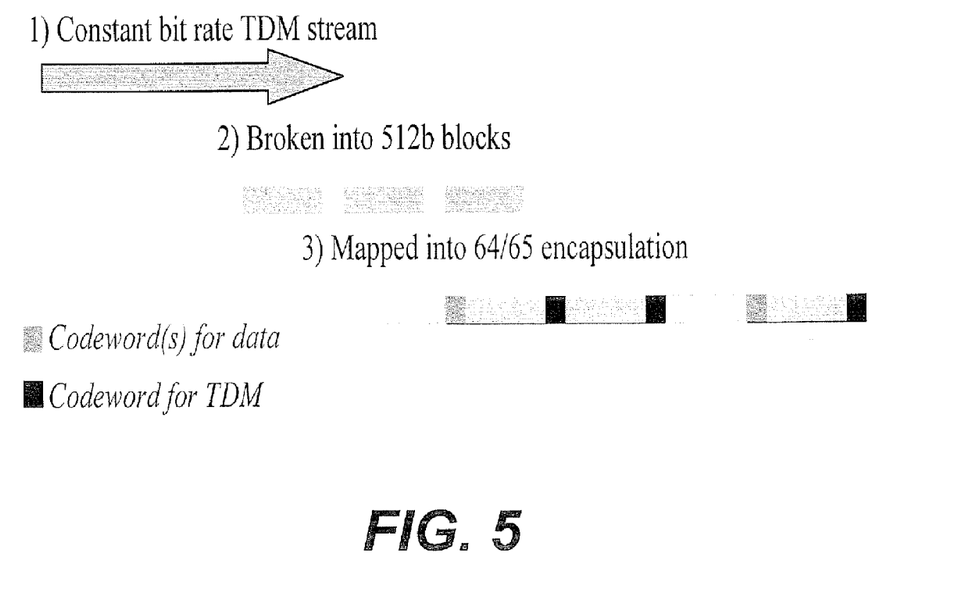
FIG. 5 is a flow diagram that illustrates communication of TDM traffic using 64/65-octet encapsulation in accordance with some embodiments of the present invention.

FIG. 5 illustrates a mapping of a constant bit rate TDM stream into the 64/65-octet encapsulation standard according to some embodiments of the present invention. As shown in FIG. 5, a 2048 Kbps TDM stream (such as an E1) would result in 4096 blocks of 512-bits every second. Each of these blocks can be mapped into the next available 64/65-octet block to provide a low latency TDM path across a 64/65-octet encapsulated line.

The line bandwidth does not have to exactly match the constant bit-rate TDM bandwidth. The line rate can exceed the bandwidth needed for the TDM service, thus leaving some of the 64/65-octet blocks unused for TDM services. Such blocks are shown as white in FIG. 5. This excess bandwidth is then available for traditional data services (e.g. Ethernet or IP), which can use standard techniques to encapsulate data traffic into the available 64/65-octet blocks. To accomplish this multi-application differentiation, TDM and data traffic can be marked by different codewords in the overhead byte of the 64/65-octet encapsulation. The data and constant bit-rate TDM traffic flows can then be treated as independent streams of information, each identified by a different set of codewords.

Codeword differentiation may allow a line to be dynamically used for "all data," "all TDM," or "both TDM and data," without strict configuration and reservation of bandwidth. The failure (or addition) of a TDM flow, or an increase or decrease in the TDM bandwidth on that line, can happen dynamically on the transmitter because strict TDM bandwidth reservation is not required as it is in traditional dual-bearer mode where the data and TDM bits are time sliced (rather than application sliced).

As discussed above, 64/65-octet encapsulation supports traffic pre-emption via the codeword field. Use of codeword partitioning may be used to ensure that constant bit-rate TDM traffic does not have to wait for data to be sent. That is, the TDM traffic may be given priority so that it jumps to the front of the queue at the next 64/65-octet block. This may allow constant bit-rate TDM traffic to meet the performance characteristics of traditional TDM services.

Communicating Multiple TDM Sources from a Single Source on a Single Line

The previous example illustrated communication of a single TDM service traffic on a single line using a traffic encapsulation technique configured to support STATMUX traffic to encapsulate blocks of the TDM traffic. In other embodiments, multiple TDM services from, for example, a single source may be mapped onto a single line or connection. For example, there may be two E1 services that must travel over the same line between the local node L and remote node R of FIG. 1.

In this case, the techniques of the above-described embodiments may still be applied. In accordance with various embodiments of the present invention, multiple TDM streams can be "merged" in a variety of ways, such that the combined constant bit rate is the sum of the individual constant bit rates. For example, two 2048 Kbps E1 services can be combined into a single 4096 Kbps service by byte interleaving (alternating octets from each service).

Embodiments of the present invention are not restricted to the approach of merging/multiplexing multiple TDM services into a single higher rate service. Once multiplexed, the higher rate combined service can be treated as any other constant bit rate TDM service.

Communicating Multiple TDM Sources from Multiple Sources on a Single Line

When multiplexing multiple TDM services from different sources onto the same connection, it may be difficult for the two sources to coordinate to provide a single combined service. For example, if the local node L had TDM inputs on two different cards within the local node, it is difficult for those inputs to coordinate to create a single combined TDM service. If the two sources were co-located, they could more easily be multiplexed (using byte interleaving or other techniques) before transmission.

Both ATM and PWE3 include mechanisms for transporting multiple circuits across a common link/network. In these mechanisms, each circuit is assigned its own circuit ID (which may or may not have to be coordinated with other nodes). A constant bit-rate circuit is then segmented into payload blocks, and each block has a header pre-pended that includes the circuit identifier. According to some embodiments of the present invention, TDM traffic multiplexing may be performed using 64/65-octet encapsulated, where each 64-octet block or frame includes a circuit identifier that identifies the circuit to which that payload belongs. These circuit identifiers are known by communicating nodes, but individual TDM sources do not have to coordinate their TDM multiplexing, only the circuit identifier assignment. In some embodiments, additional information may be included in the TDM block or frame header. In particular, protection may be applied to the header in the form of a cyclic redundancy check (CRC) or other mechanism that can be used to detect and/or correct errors in the header. Error detection and/or correction can be beneficial because the header information is in general very important, and corruption of the header can result in significant errors or faults in the circuit, and possibly other circuits.

Figure 6:
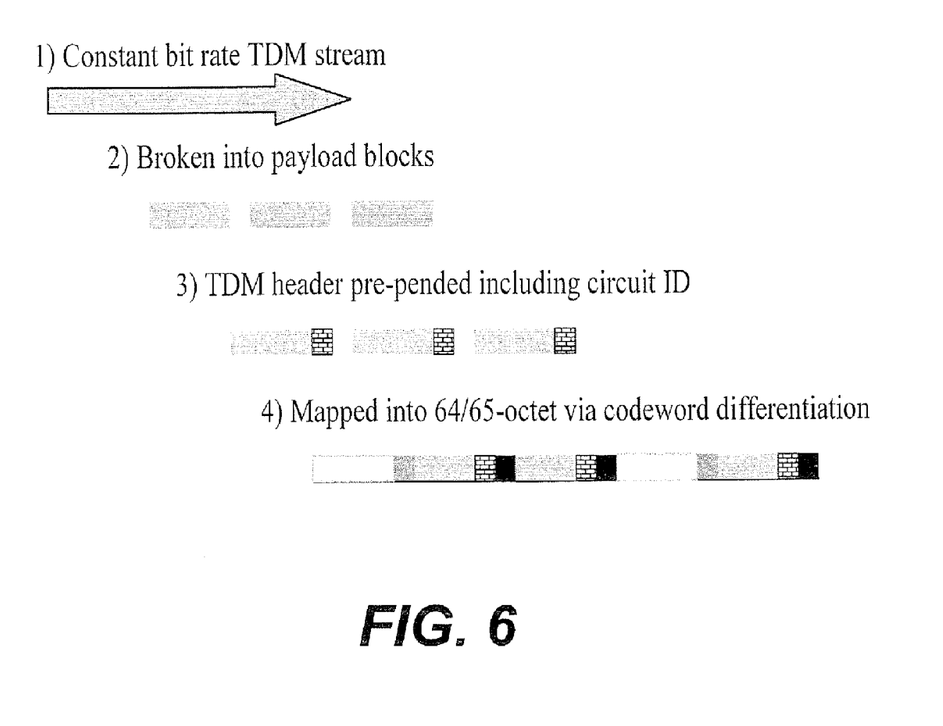
FIG. 6 is a flow diagram that illustrates communication of multiple independent TDM traffic streams using 64/65-octet encapsulation in accordance with some embodiments of the present invention.

FIG. 6 illustrates communication of multiple, independent TDM traffic streams using 64/65-octet encapsulation where a TDM header that comprises, for example, a circuit identification, that is incorporated into the payload field of each 64-octet block or frame. Multiple TDM streams may be transported over a 64/65-octet encapsulated line by breaking each stream into an appropriately sized TDM block, pre-pending a header to the TDM block that contains information, such as, for example, a circuit identifier and header protection, and transmitting that TDM block in the next available 64/65-octet block. The codeword octet may still be used to differentiate between TDM traffic and STATMUX/data traffic. Additional information, such as error signal, for example, may also be included in the TDM header in the payload field as needed.

In other embodiments, TDM traffic circuits may be differentiated using different codewords for the different circuits. In these embodiments, the circuit identifier is effectively moved in the codeword octet of the 64/65-octet encapsulation block or frame. Because of the limited bits available in the codeword octet, fewer circuits may be supported and the circuit identification may be coordinated with the physical layer.

Communicating TDM or TDM and STATMUX Traffic on Multiple Lines

The previous sections have discussed embodiments related to communicating TDM traffic or TDM and STATMUX/data traffic on a single line. According to some embodiments of the present invention, TDM services or TDM and STATMUX/data services can be delivered over a bonded group of lines. The network model of FIG. 1 is applicable in which a local and remote node (L and R) are interconnected by an aggregate of lines B, where each node system could be a distributed system as shown in FIG. 3, with TDM interfaces, data interfaces, and access lines each potentially distributed across multiple sub-objects (e.g. cards) within a node.

Ethernet bonding relies on the capability to balance traffic across the multiple links in a bonded group based on the relative speeds of each link in the group. Delivering TDM traffic over a bonded group may also involve balancing the traffic across multiple lines. Otherwise, the excess capacity (the bandwidth not used by TDM) of the lines may become very unbalanced, which may result in inefficiency or even the inability to use the bandwidth on one or more of the lines, or simply poor performance (jitter, latency).

Figure 7:
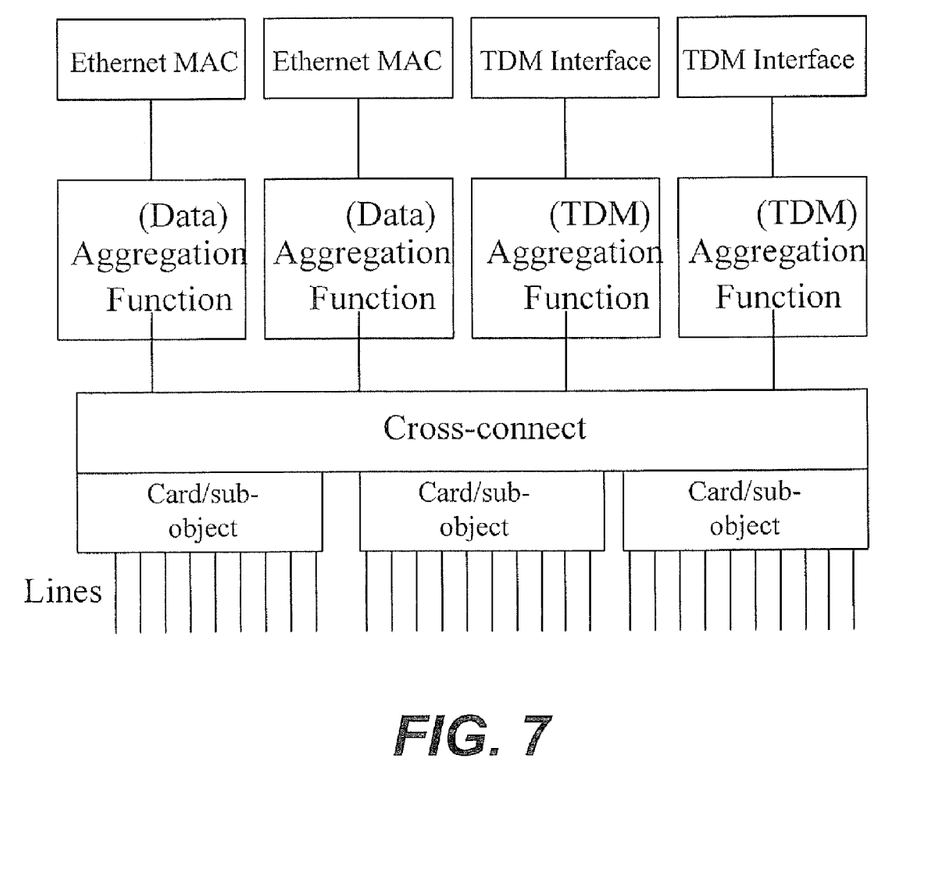
FIG. 7 is a block diagram that illustrates a line bonding architecture for communicating TDM traffic or TDM traffic and/or data traffic in accordance with some embodiments of the present invention.

In some embodiments of the present invention, similar traffic distribution algorithms may be used for STATMUX/data traffic, e.g., Ethernet traffic, and TDM traffic over a bonded group. Similarity may also yield an implementation advantage in that only one algorithm is required, which is the same for both applications. FIG. 7 illustrates a TDM bonding architecture that may be used to distribute TDM traffic over a plurality of lines asynchronously and also uses a similar distribution algorithm(s) as Ethernet bonding in accordance with some embodiments of the present invention. The FIG. 7 architecture may provide a virtual interface for the plurality of lines using link aggregation as defined in the IEEE 802.3 Ethernet standard. The TDM traffic may be distributed onto the plurality of lines asynchronously via the virtual interface.

In FIG. 7, the same or a similar aggregation function can be used for partitioning the TDM application across multiple lines as is used for partitioning the data application across multiple lines. In both cases, the aggregation function may segment a larger data block (an Ethernet frame, a constant bit-rate TDM stream, etc.) into smaller blocks (Ethernet fragments, TDM blocks, etc.), which it then distributes across multiple lines in a bonded group in a manner that reduces latency (e.g., send more information over faster lines). As part of the process, the distribution algorithm prepends a header that includes a sequence number so that the remote node can re-assemble the distributed information in order. In the case of data, the header also includes bit(s) to indicate the start (and/or end) of a data frame. These bits are generally not necessary for TDM as there is no start/end to the constant bit-rate stream, although they could be included and set to indicate that each TDM fragment is complete. Each line may be associated with at most one data aggregation function; however, in some embodiments, each line could be associated with multiple TDM aggregation functions as circuit identifiers can be used to differentiate multiple TDM streams as discussed above.

Thus, according to some embodiments of the present invention, TDM traffic may be distributed onto a plurality of lines asynchronously. Strict low-level coordination within the system is not required as with traditional TDM interleaving techniques. Moreover, the same TDM traffic encapsulation techniques discussed above with respect to using 64/65-octet encapsulation can be applied in communicating the TDM and/or the STATMUX/data traffic.

Distribution decisions may be made based on how much information (TDM and/or data) is already in-queue at the line to be transmitted. In some embodiments, a feedback mechanism is used from the lines to the aggregation function so that the aggregation function has visibility into how "full" each line currently is so that the distribution process can make intelligent distribution decisions for both TDM and data applications.

In accordance with various embodiments of the present invention, the "fullness" of a line can be measured by the number of octets waiting to be transmitted on that line. Alternatively, "fullness" can be measured as the amount of time required to transmit the octets waiting in queue. By using a fullness measure based on the amount of time required to transmit the queued octets, the variability of the link speeds may be taken into account, i.e., the traffic distribution process does not have to know anything about link speeds as it may optimize latency based on these speed/time normalized values.

Such an approach is dynamic in that adapting to additional or removed lines is almost instantaneous. In some embodiments, a new line appears to have an initial fullness measure of zero or "empty," while a faulted/removed line appears to have an infinite fullness measure or "completely full" until it becomes available again.

This approach is generally flexible in that the lines can be distributed across many sub-objects (cards, switches, etc.) in a node, and the distribution of the lines is not a factor in the fragmentation process. The distribution process may use a current view of the backlog on each line and it can make load-balancing decisions based on that.

TDM application(s) can receive generally low latency because its feedback information can, in some embodiments, be based only on other TDM blocks in-queue at the lines, i.e., TDM fullness measures can be based only on TDM traffic blocks in-queue, while the data application feedback can consider both data and TDM blocks in-queue at the line, i.e., STATMUX/data traffic fullness measures can be based on both TDM traffic blocks and STATMUX/data traffic blocks in-queue. This may give constant-bit rate TDM traffic priority and pre-emption over data traffic.

The TDM application can consist of several independent TDM streams as shown in FIG. 7, and each distribution process handles its own circuit. Alternatively, in other embodiments, the TDM application can use just a single distribution process, where multiple circuits are merged before being distributed across lines, each with its own circuit ID. The end result is the same—the distribution process transmits TDM payload over the bonded group of lines, where each payload may be pre-pended with a re-sequencing header (sequence number) and a TDM header (circuit ID, protection bits, other information potentially). Combining these header fields into a single TDM/re-sequencing header may allow the protection bits to apply to both the re-sequencing information as well as the circuit identification.

Although FIGS. 1-7 illustrate exemplary communication network architectures, methods, systems, and computer program products, it will be understood that the present invention is not limited to such configurations, but is intended to encompass any configuration capable of carrying out the operations described above. It will be appreciated that the functionality of any or all of the blocks of FIGS. 1-7 may be implemented using one or more application specific integrated circuits (ASICs), discrete hardware components, a programmed digital signal processor or microcontroller, and/or combinations thereof. In this regard, computer program code for carrying out operations of the respective modules discussed above with respect to FIGS. 1-7 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even microcode to enhance performance and/or memory usage.

Many variations and modifications can be made to the preferred embodiments without substantially departing from the principles of the present invention. All such variations and modifications are intended to be included herein within the scope of the present invention, as set forth in the following claims.

That which is claimed:

1. A method of operating a communication network, comprising:
   performing operations as follows on at least one processor:
   communicating Time Division Multiplexing (TDM) traffic on a single line using a Statistical Multiplexing (STATMUX) traffic encapsulation standard to encapsulate blocks of the TDM traffic.

2. The method of claim 1, wherein the traffic encapsulation standard is 64/65-octet encapsulation.

3. The method of claim 2, wherein the TDM traffic comprises constant bit-rate TDM traffic.

4. The method of claim 3, further comprising:
   communicating STATMUX traffic on the single line with the TDM traffic using the 64/65-octet encapsulation standard.

5. The method of claim 4, further comprising:
   using a 64/65-octet encapsulation standard codeword to differentiate TDM traffic from STATMUX traffic.

6. The method of claim 4, further comprising:
   dynamically adjusting an amount of TDM traffic and/or STATMUX traffic carried on the single line over time.

7. The method of claim 1, further comprising:
   combining a first constant bit-rate TDM traffic stream with a second constant bit-rate TDM traffic stream to generate a TDM traffic stream having a constant bit-rate equal to the sum of the first and second constant bit-rates;
   wherein communicating the TDM traffic comprises communicating the TDM traffic stream having the constant bit-rate equal to the sum of the first and second constant bit-rates.

8. The method of claim 1, wherein communicating TDM traffic comprises:
   multiplexing a plurality of TDM traffic streams onto the single line.

9. The method of claim 8, wherein the traffic encapsulation standard is 64/65-octet encapsulation and wherein multiplexing the plurality of TDM traffic streams comprises:
   communicating a TDM header in a payload field of the 64/65-octet encapsulation block that contains a circuit identifier, which identifies one of the plurality of TDM traffic streams that the block is associated with.

10. The method of claim 9, wherein the TDM header comprises an error detection and/or correction portion.

11. The method of claim 8, wherein the traffic encapsulation standard is 64/65-octet encapsulation and wherein multiplexing the plurality of TDM traffic streams comprises:
    using a codeword field of the 64/65-octet encapsulation block to identify one of the plurality of TDM traffic streams that the block is associated with.

12. A method of operating a communication network, comprising:
    performing operations as follows on at least one processor:
    distributing Time Division Multiplexing (TDM) traffic onto a plurality of lines asynchronously without copying the TDM traffic between the plurality of lines.

13. The method of claim 12, further comprising:
    using a traffic encapsulation standard configured to support Statistical Multiplexing (STATMUX) traffic to encapsulate blocks of the TDM traffic on each of the plurality of lines.

14. The method of claim 12, wherein the TDM traffic comprises constant bit-rate TDM traffic.

15. The method of claim 12, wherein the lines do not all have a same bandwidth associated therewith.

16. The method of claim 12, wherein a number of the plurality of lines changes dynamically.

17. The method of claim 12, further comprising:
    dynamically adjusting an amount of TDM traffic distributed to the plurality of lines based on a total bandwidth available on the plurality of lines.

18. The method of claim 12, further comprising:
    determining respective fullness measures for each of the plurality of lines, each fullness measure indicating a number of octets waiting to be transmitted on a respective one of the lines and/or a time required to transmit the number of octets waiting to be transmitted on the respective one of the lines.

19. The method of claim 18, wherein distributing the TDM traffic comprises:
    distributing the TDM traffic onto the plurality of lines asynchronously based on the fullness measures associated with the lines, respectively.

20. The method of claim 19, wherein a faulted and/or removed line has an effective infinite fullness measure associated therewith and a new line has an effective initial fullness measure of zero.

21. The method of claim 12, further comprising:
    creating a virtual interface for the plurality of lines using link aggregation as defined in the IEEE 802.3 Ethernet standard; and
    distributing the TDM traffic onto the plurality of lines asynchronously via the virtual interface.

22. The method of claim 12, further comprising:
    distributing Statistical Multiplexing (STATMUX) traffic onto the plurality of lines.

23. The method of claim 22, further comprising:
    determining respective TDM fullness measures for each of the plurality of lines, each TDM fullness measure indicating a number of TDM traffic octets waiting to be transmitted on a respective one of the lines and/or a time required to transmit the number of TDM traffic octets waiting to be transmitted on the respective one of the lines; and
    determining respective STATMUX fullness measures for each of the plurality of lines, each STATMUX fullness measure indicating a number of TDM traffic octets and STATMUX traffic octets waiting to be transmitted on a respective one of the lines and/or a time required to transmit the number of TDM traffic octets and STATMUX traffic octets waiting to be transmitted on the respective one of the lines.

24. The method of claim 23, wherein distributing the TDM traffic comprises:
    distributing the TDM traffic onto the plurality of lines asynchronously based on the TDM fullness measures associated with the lines, respectively; and
    distributing the STATMUX traffic onto the plurality of lines based on the STATMUX fullness measures associated with the lines, respectively.

25. The method of claim 12, wherein distributing TDM traffic comprises:
    multiplexing a plurality of TDM traffic streams onto one of the plurality of lines.

26. The method of claim 25, wherein a 64/65-octet encapsulation standard is used to encapsulate blocks of the TDM traffic and wherein multiplexing the plurality of TDM traffic streams comprises:

communicating a TDM header in a payload field of the 64/65-octet encapsulation block that contains a circuit identifier, which identifies one of the plurality of TDM traffic streams that the block is associated with.

27. The method of claim 26, wherein the TDM header comprises an error detection and/or correction portion.

28. The method of claim 25, wherein a 64/65-octet encapsulation standard is used to encapsulate blocks of the TDM traffic and wherein multiplexing the plurality of TDM traffic streams comprises:

using a codeword field of the 64/65-octet encapsulation block to identify one of the plurality of TDM traffic streams that the block is associated with.

* * * * *